(12) United States Patent
Tsai (10) Patent No.: US 9,004,110 B2
(45) Date of Patent: Apr. 14, 2015

(54) WATER HAMMER ARRESTOR

(71) Applicant: Kuo-Chen Tsai, Taipei (TW)

(72) Inventor: Kuo-Chen Tsai, Taipei (TW)

(73) Assignee: Tsai, Kuo-Chen, Taipei (TW)

( * ) Notice: Subject to any disclaimer, the term of this patent is extended or adjusted under 35 U.S.C. 154(b) by 18 days.

(21) Appl. No.: 13/924,610

(22) Filed: Jun. 23, 2013

(65) Prior Publication Data

US 2014/0299216 A1    Oct. 9, 2014

(30) Foreign Application Priority Data

Apr. 8, 2013 (TW) .............................. 102206295 U (51) Int. Cl.
*F16L 55/04* (2006.01)
*F16L 55/045* (2006.01)

(52) U.S. Cl.
CPC .................................. *F16L 55/045* (2013.01)

(58) Field of Classification Search
USPC .................................. 138/26, 44, 109, 38, 39
See application file for complete search history.

(56) References Cited

U.S. PATENT DOCUMENTS

| | | | |
|---|---|---|---|
| 1,663,998 A * | 3/1928 | Schmidt | 415/204 |
| 2,129,145 A * | 9/1938 | Lincoln | 239/109 |
| 2,413,878 A * | 1/1947 | Maky | 285/220 |
| 2,687,147 A * | 8/1954 | Feichter | 138/44 |
| 2,733,908 A * | 2/1956 | Graham | 165/179 |
| 3,545,492 A * | 12/1970 | Scheid, Jr. | 138/42 |
| 3,582,048 A * | 6/1971 | Sarem | 366/340 |
| 3,595,299 A * | 7/1971 | Weishaupt et al. | 159/28.5 |
| 3,687,493 A * | 8/1972 | Lock et al. | 285/333 |
| 3,934,614 A * | 1/1976 | Elek et al. | 138/44 |
| 4,776,177 A * | 10/1988 | Jancic et al. | 62/123 |
| 4,832,500 A * | 5/1989 | Brunold et al. | 366/268 |
| 4,929,088 A * | 5/1990 | Smith | 366/337 |
| 5,309,946 A * | 5/1994 | Ligneul | 138/39 |
| 5,364,136 A * | 11/1994 | Forti et al. | 285/148.22 |
| 5,937,906 A * | 8/1999 | Kozyuk | 138/37 |
| 5,992,465 A * | 11/1999 | Jansen | 138/37 |
| 6,042,263 A * | 3/2000 | Mentzer et al. | 366/340 |
| 6,520,211 B1 * | 2/2003 | Esser | 138/96 T |
| 2010/0140928 A1 * | 6/2010 | Becker et al. | 285/321 |

* cited by examiner

*Primary Examiner* — James Hook
(74) *Attorney, Agent, or Firm* — Yuwen Guo (57) ABSTRACT

A hollow, cylindrical water hammer arrestor includes an axial passage; two externally threaded extensions disposed at both ends respectively, each of the externally threaded extensions having a diameter less than that of the axial passage; a plurality of first rings disposed in the axial passage, each of the first rings having a plurality of teeth formed on an inner surface; and a plurality of second rings disposed in the axial passage, each of the second rings having a smooth inner surface. The first and second rings are alternately disposed from one end of the axial passage to the other end in the axial passage.

5 Claims, 9 Drawing Sheets

WATER HAMMER ARRESTOR

BACKGROUND OF THE INVENTION

1. Field of the Invention

The invention relates to water hammer arrestor and more particularly to a hollow, cylindrical water hammer arrestor including internal rings with toothed inner surface for reducing or eliminating water hammer.

2. Description of Related Art

Water hammer is a pressure surge or wave caused when a fluid in motion is forced to stop or change direction suddenly. Water hammer typically occurs when a valve closes suddenly at an end of a pipeline system, and a pressure wave propagates in the pipe. This pressure wave can cause major problems, from noise and vibration to pipe collapse.

A conventional water hammer arrestor comprises a cylindrical housing having a closed upper end, an internal pressure chamber receiving a reaction force medium, and an opening having a circular distal end of one portion of the opening; a piston slidably disposed in the housing and having a space communicating with the internal pressure chamber and receiving the reaction force medium; a connector connected to the opening of the housing having a thread formed on one end of the connector, a first annular groove formed on a circumferential outside surface of the other end of the connector, and a second annular groove formed on a radial surface of the connector and disposed between the first annular groove and the thread, and the second annular groove accommodating the insertion of the circular distal end of the opening; and a convex portion formed on the other portion of the opening for fitting the first annular groove.

Notwithstanding the prior art, the invention is neither taught nor rendered obvious thereby.

SUMMARY OF THE INVENTION

It is therefore one object of the invention to provide a hollow, cylindrical water hammer arrestor comprising an axial passage; two externally threaded extensions disposed at both ends respectively, each of the externally threaded extensions having a diameter less than that of the axial passage; a plurality of first rings disposed in the axial passage, each of the first rings having a plurality of teeth formed on an inner surface; and a plurality of second rings disposed in the axial passage, each of the second rings having a smooth inner surface; wherein the first and second rings are alternately disposed from one end of the axial passage to an other end in the axial passage.

The above and other objects, features and advantages of the invention will become apparent from the following detailed description taken with the accompanying drawings.

DETAILED DESCRIPTION OF THE INVENTION

Referring to FIGS. 1 to 5, a hollow, cylindrical water hammer arrestor 1 in accordance with the invention is installed between, for example, one pipe A and another pipe A of a piping system, comprises the following components as discussed in detail below.

An axial passage 11 is provided for allowing fluid to pass. Two externally threaded extensions 12 having a diameter less than that of the passage 1 are provided at both ends. An internally threaded pipe coupling 13 is adapted to join either of the externally threaded extensions 12 and a pipe A. A plurality of first rings 2 having a plurality of teeth 21 formed on an inner surface, and a plurality of second rings 3 having a smooth inner surface 31 are alternately provided from one end to the other end in the passage 1.

Figure 1:
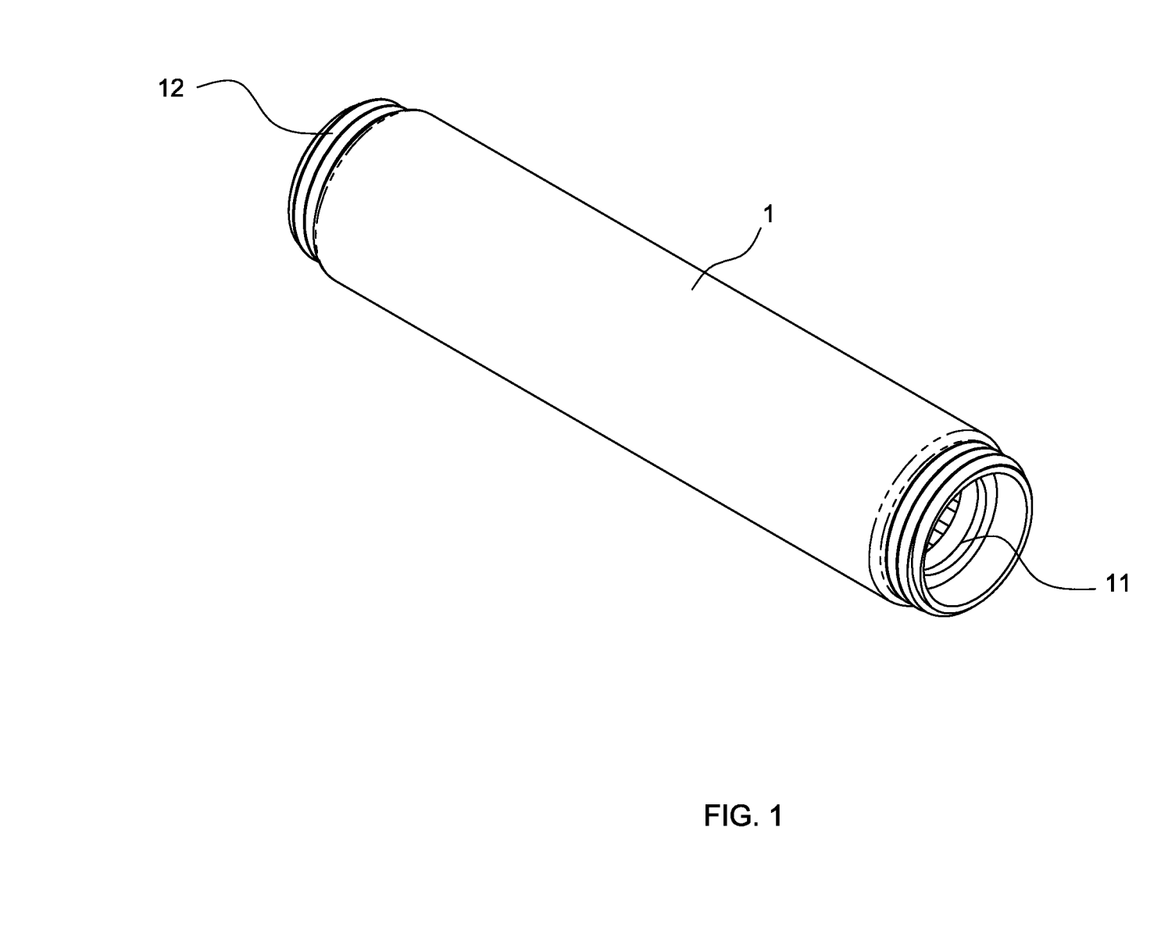
FIG. 1 is a perspective view of a water hammer arrestor according to the invention.
Figure 2:
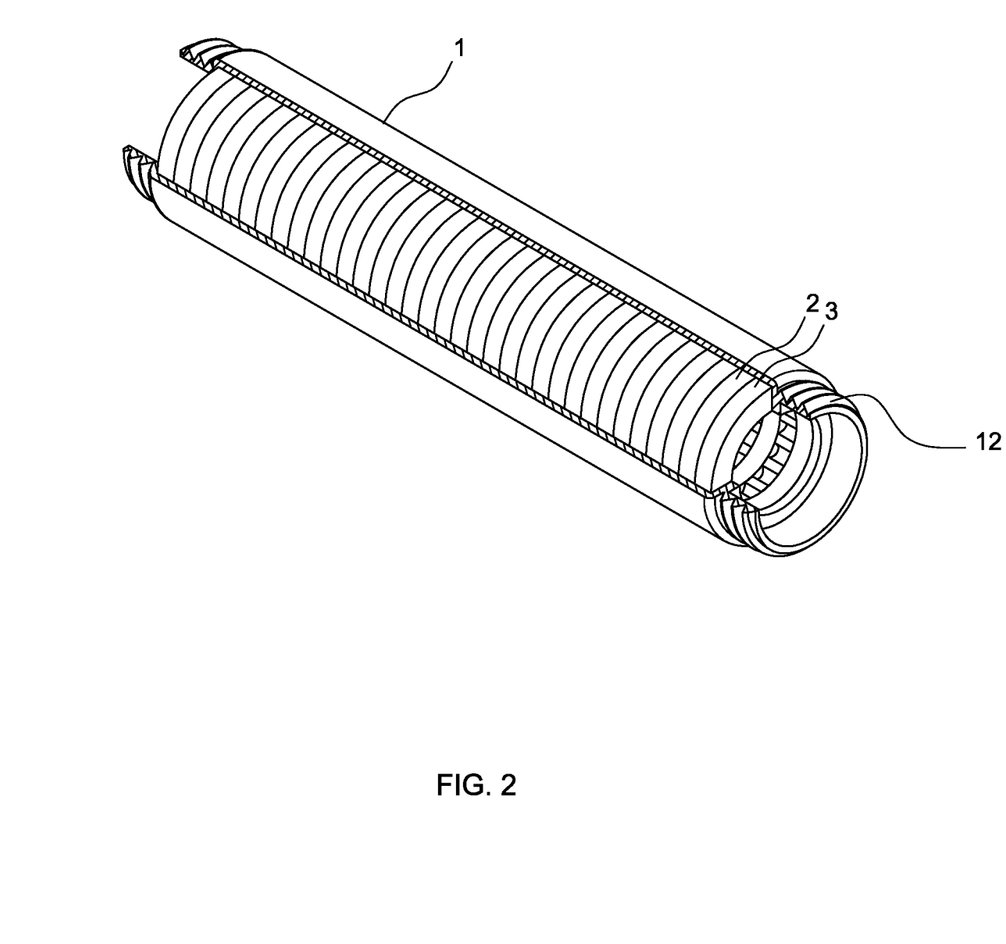
FIG. 2 is a broken-away perspective view of the water hammer arrestor.
Figure 2A:
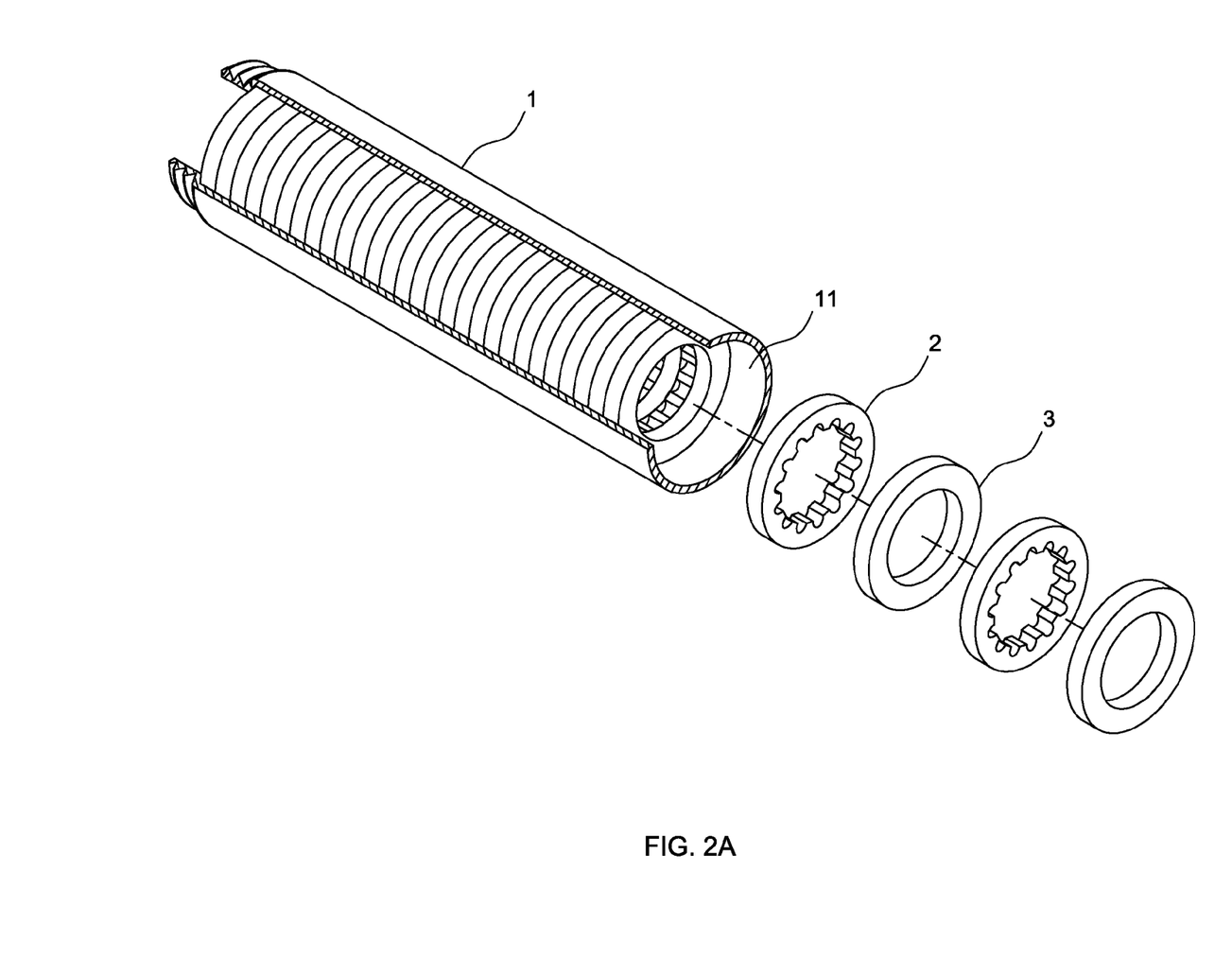
FIG. 2A is a view similar to FIG. 2 with two first rings and two second rings being detached.
Figure 2B:
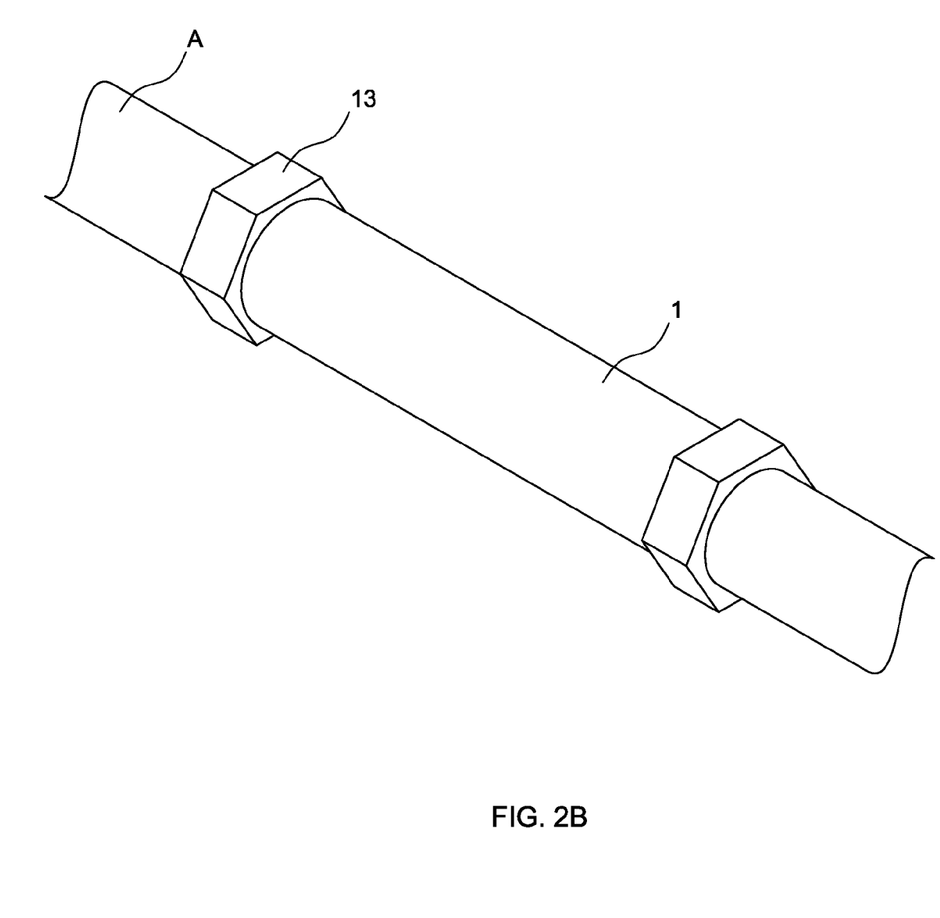
FIG. 2B is a perspective view of the water hammer arrestor installed between two pipes.
Figure 3:
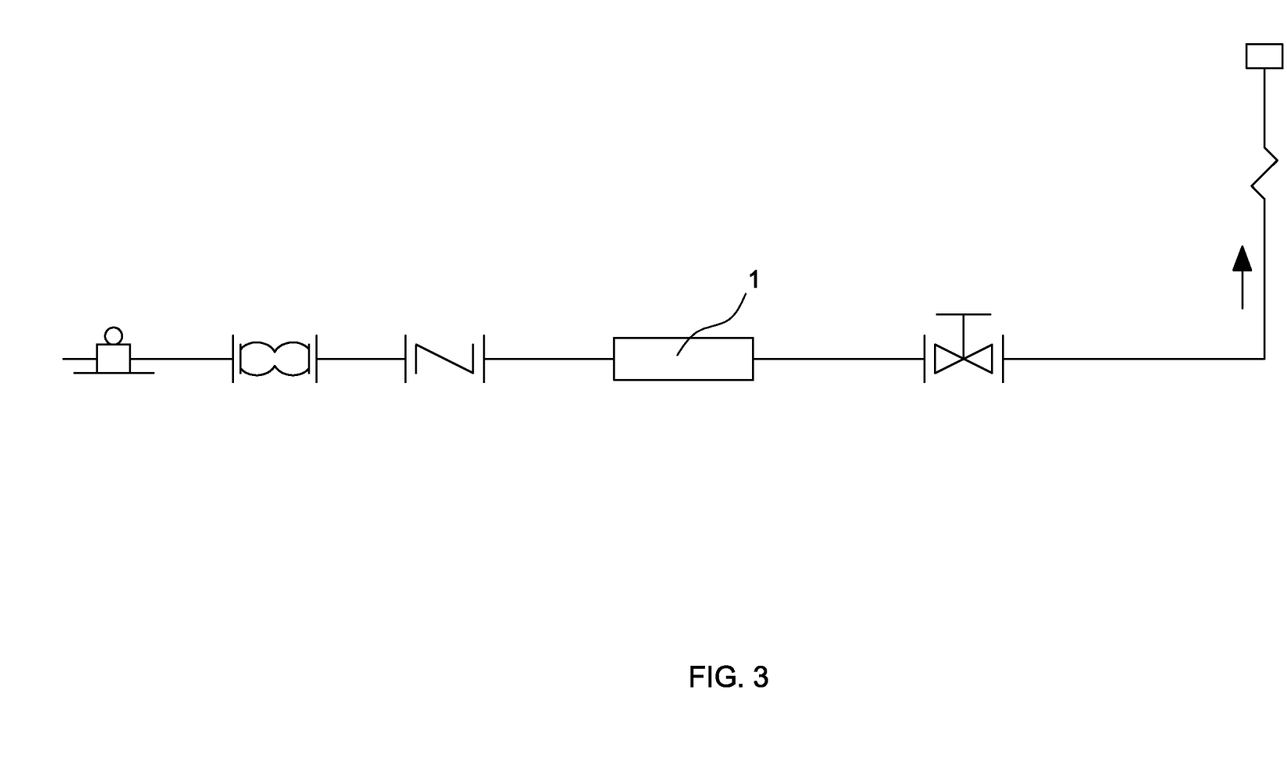
FIG. 3 schematically depicts a piping system incorporating the water hammer arrestor.
Figure 3A:
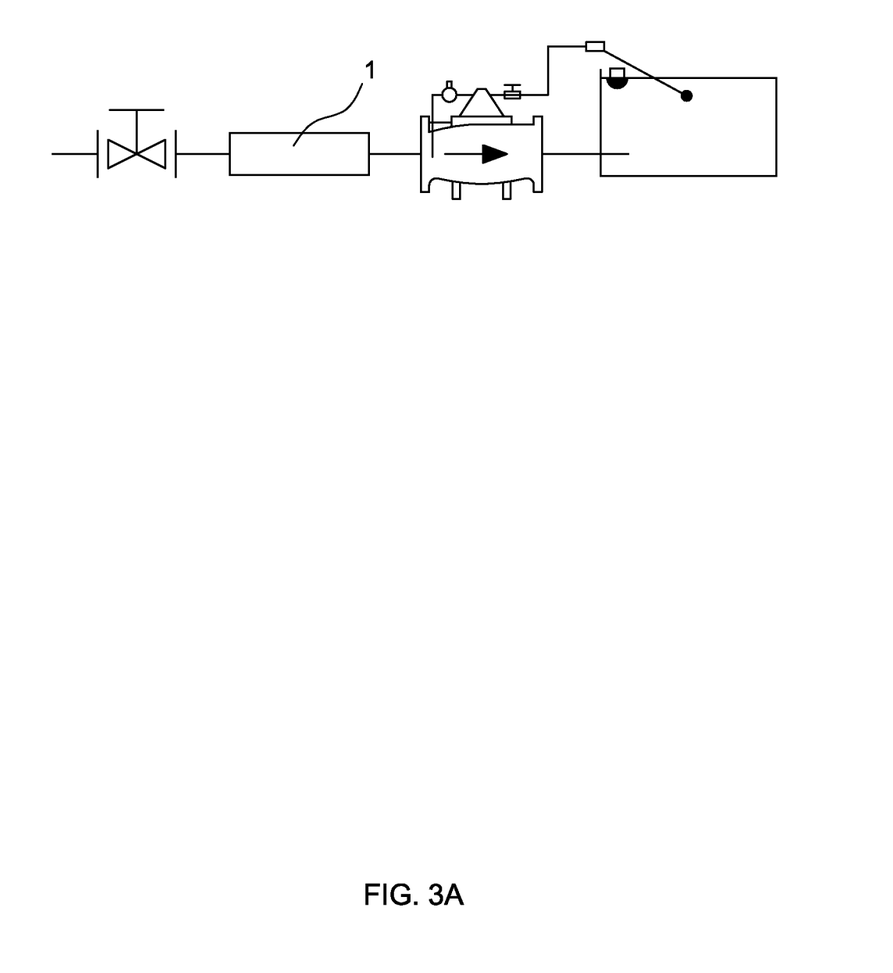
FIG. 3A schematically depicts another piping system incorporating the water hammer arrestor.
Figure 4:
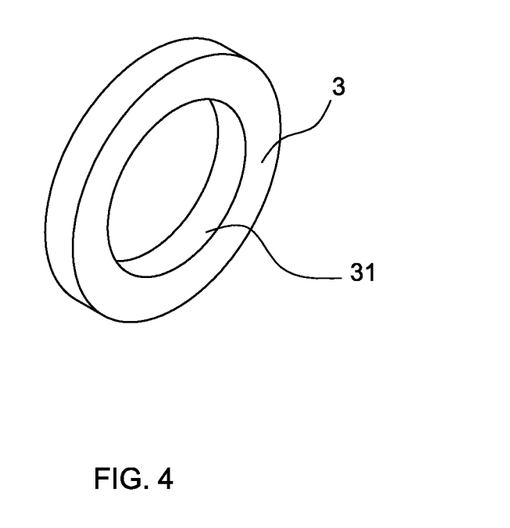
FIG. 4 is a perspective view of the second ring.
Figure 4A:
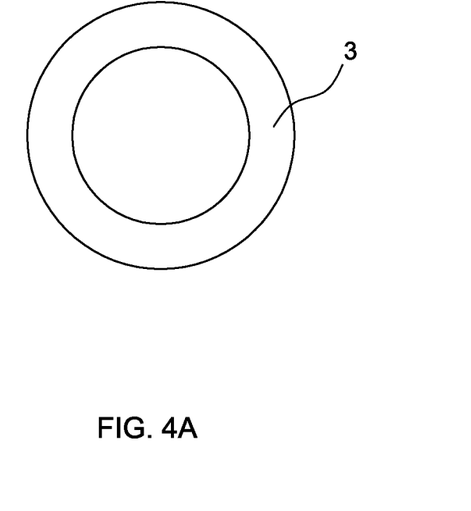
FIG. 4A is an end view of the second ring shown in FIG. 4.

Further, two O-rings (not shown) are provided and each O-ring is compressed between the internally threaded pipe coupling 13 and the corresponding externally threaded extension 12 for sealing.

Figure 5:
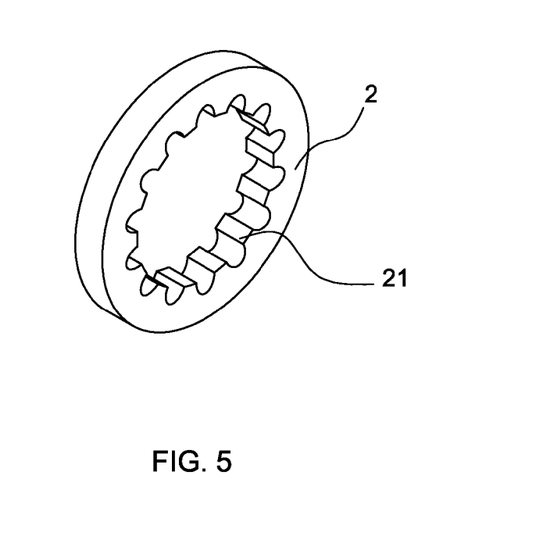
FIG. 5 is a perspective view of the first ring.

It is envisaged by the invention that the provision of both the first rings 2 and the second rings 3, particularly the teeth 21, can absorb the shock and stop banging, thereby reducing or eliminating water hammer.

Figure 5A:
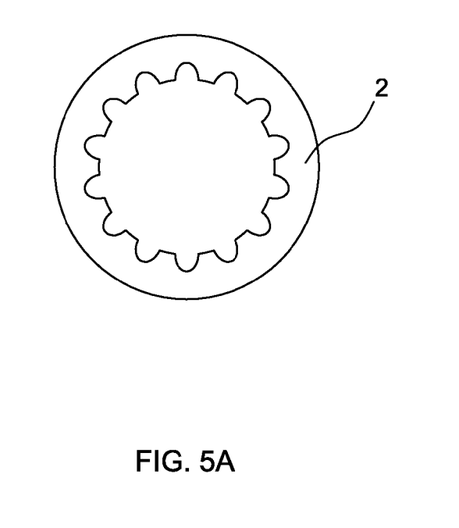
FIG. 5A is an end view of the first ring shown in FIG. 5.
Figure 6:
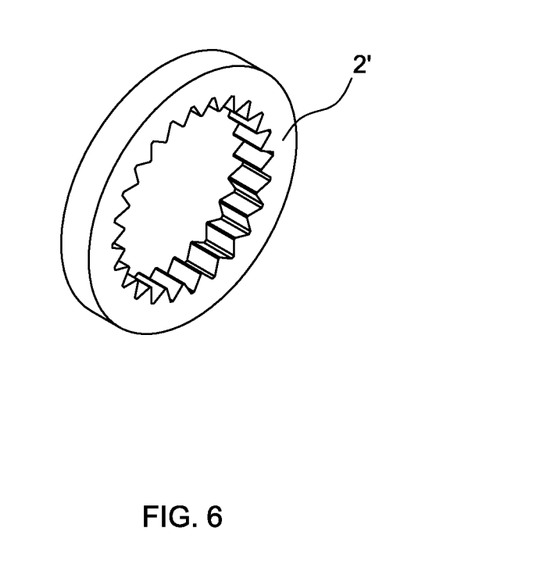
FIG. 6 is a perspective view of another preferred embodiment of the first ring.
Figure 6A:
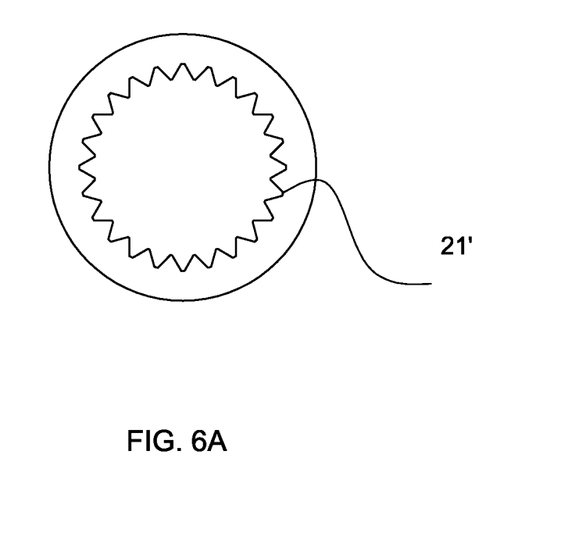
FIG. 6A is an end view of the first ring shown in FIG. 6.

Referring to FIGS. 6 and 6A, in another preferred embodiment each of teeth 21' of one of a plurality of first rings 2' has a longitudinal section of triangle which is different from the truncated trapezoidal section of each of the teeth 21 shown in FIGS. 5 and 5A.

While the invention has been described in terms of preferred embodiments, those skilled in the art will recognize that the invention can be practiced with modifications within the spirit and scope of the appended claims.

What is claimed is:

1. A hollow, cylindrical water hammer arrestor comprising:
an axial passage;
two externally threaded extensions disposed at both ends respectively, each of the externally threaded extensions having a diameter less than that of the axial passage;
a plurality of first rings disposed in the axial passage, each of the first rings having a plurality of teeth formed on an inner surface; and
a plurality of second rings disposed in the axial passage, each of the second rings having a smooth inner surface;
wherein the first and second rings are alternately disposed from one end of the axial passage to an other end in the axial passage.

2. The hollow, cylindrical water hammer arrestor of claim 1, wherein each of the teeth have a longitudinal section of triangle.

3. The hollow, cylindrical water hammer arrestor of claim 1, wherein each of the teeth have a longitudinal section of truncated trapezoid.

4. The hollow, cylindrical water hammer arrestor of claim 1, further comprising two internally threaded pipe couplings for joining the externally threaded extensions respectively.

5. The hollow, cylindrical water hammer arrestor of claim 4, further comprising two O-rings each compressed between the internally threaded pipe coupling and the corresponding externally threaded extension for sealing.

* * * * *